INVENTOR.
JOSEPH GOGAN
BY Hudson, Boughton,
Williams, David & Hoffman
ATTORNEYS

Sept. 19, 1961 J. GOGAN 3,000,427
MACHINE FOR PRODUCING HELICALLY COILED ARTICLES
Filed Aug. 8, 1958 6 Sheets-Sheet 4

INVENTOR.
JOSEPH GOGAN
BY Hudson, Boughton,
Williams, David & Hoffmann
ATTORNEYS

INVENTOR.
JOSEPH GOGAN
BY
ATTORNEYS

United States Patent Office 3,000,427
Patented Sept. 19, 1961

3,000,427
MACHINE FOR PRODUCING HELICALLY
COILED ARTICLES
Joseph Gogan, Wisner Road, R.F.D. 2, Willoughby, Ohio
Filed Aug. 8, 1958, Ser. No. 754,007
4 Claims. (Cl. 153—67)

The present invention relates to coiling machines, and more particularly to an improved coiling machine of the type wherein wire or hot rod is coiled about a rotatable mandrel to produce a helical article, usually a relatively heavy helical spring.

The invention is particularly adapted for, and is described with reference to, the manufacture of relatively heavy helical springs such as those employed in individual wheel suspension of automobiles. Other applications for which this type of machine is useful include the making of helical coils of tubing, either with or without fins, such as are required in various forms of heat exchangers.

An object of this invention is to provide a novel coiling machine capable of rapid production of articles of uniformly high quality, which machine is rugged in nature and simple in design.

A further object is to provide a coiling machine which features novel constructions in its various parts which permit a more accurate and a more fully automatic operation than has been heretofore attainable. In accordance with that object the machine of this invention embodies improved mechanism for clamping the work to the mandrel. It also embodies an indexing feature that operates to center the machine accurately thereby facilitating the insertion of stock and assuring a uniform product, and a control system which relieves the operator of the necessity of controlling various phases of the operating cycle.

These and other objects and advantages of the invention will be apparent to those skilled in the art to which it pertains, and a more complete understanding may be had of the preferred embodiments of the invention by reference to the following detailed description and to the accompanying drawings forming a part of this specification and in which:

FIG. 10 is a front elevation of a completed article showing representative tapered ends.

Figure 1:
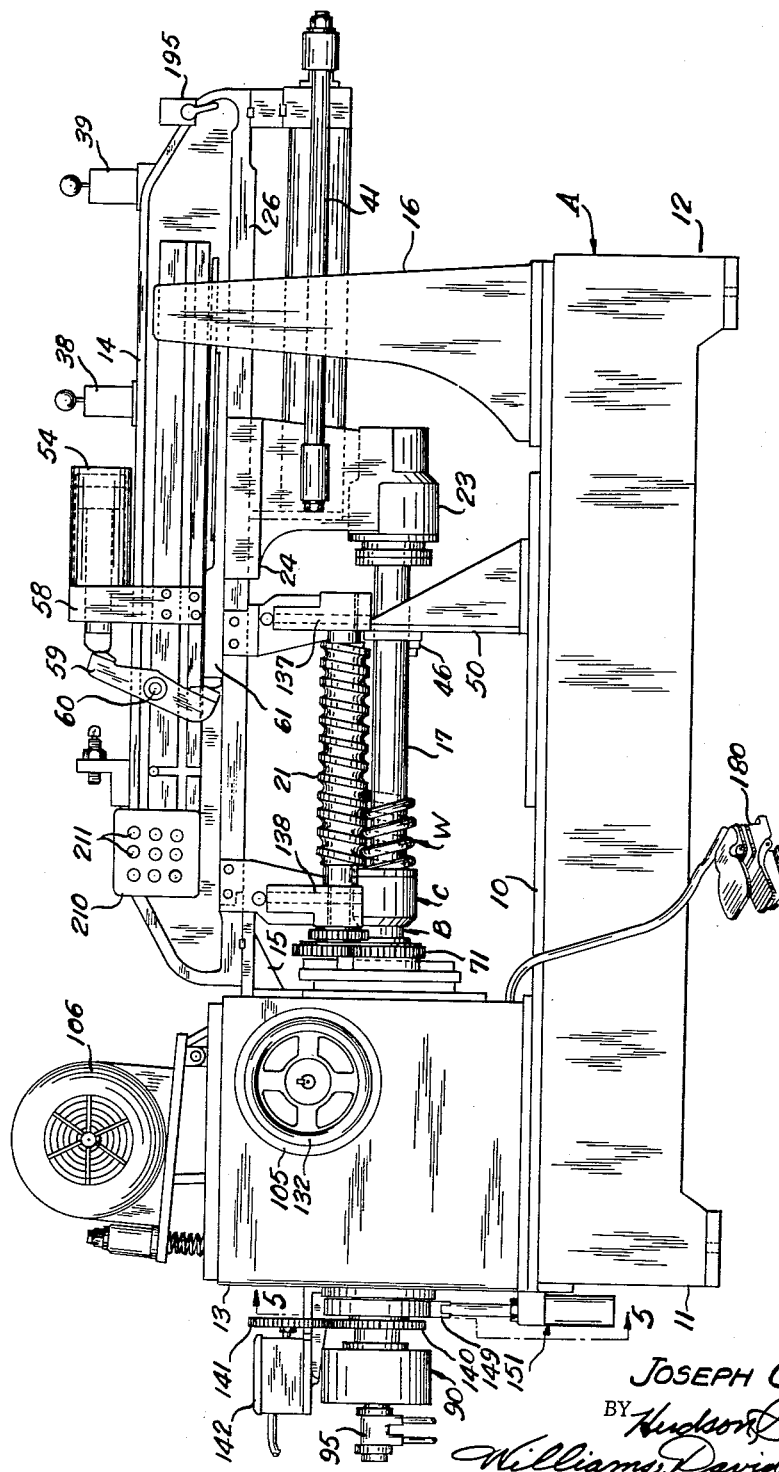
FIG. 1 is a front elevation of a machine for making coiled articles and embodying the present invention.
Figure 2:
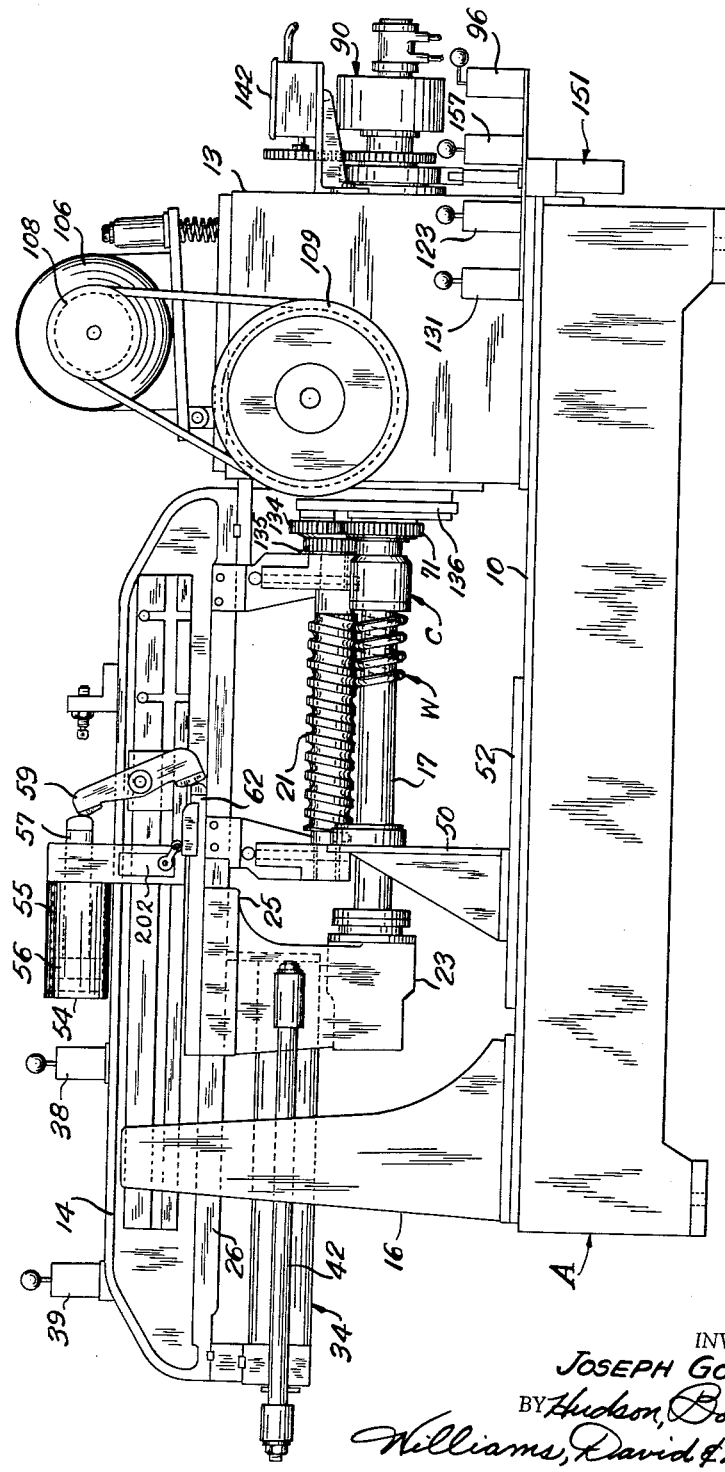
FIG. 2 is an elevation of the back of the machine of FIG. 1.
Figure 3:
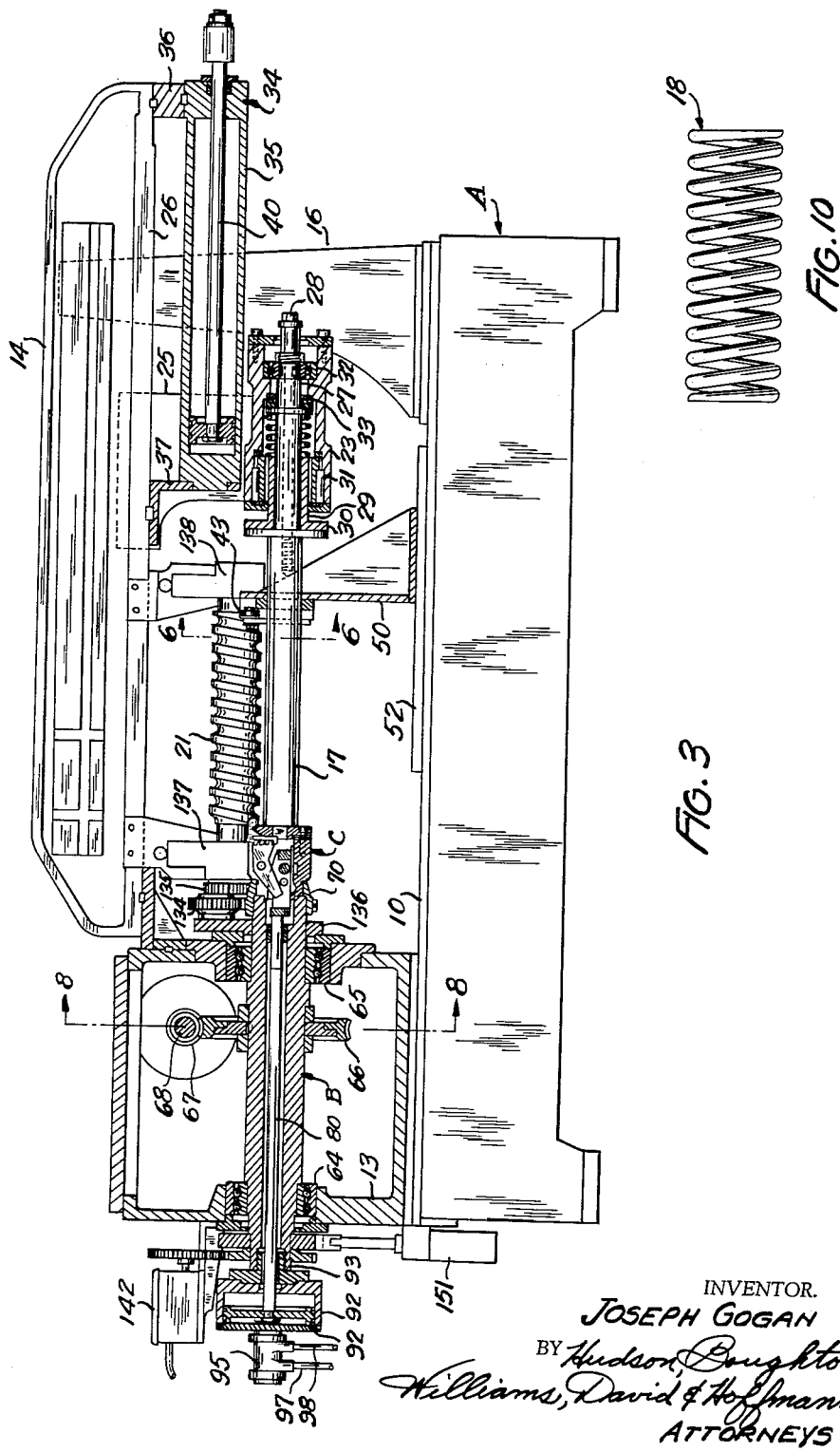
FIG. 3 is a longitudinal sectional view taken substantially on section line 3—3 of FIG. 4 with some parts removed.
Figure 4:
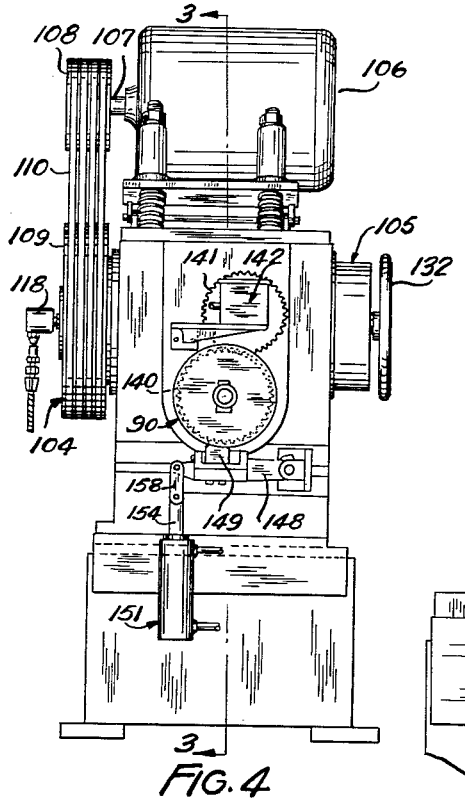
FIG. 4 is an end view of the power input end of the machine.
Figure 5:
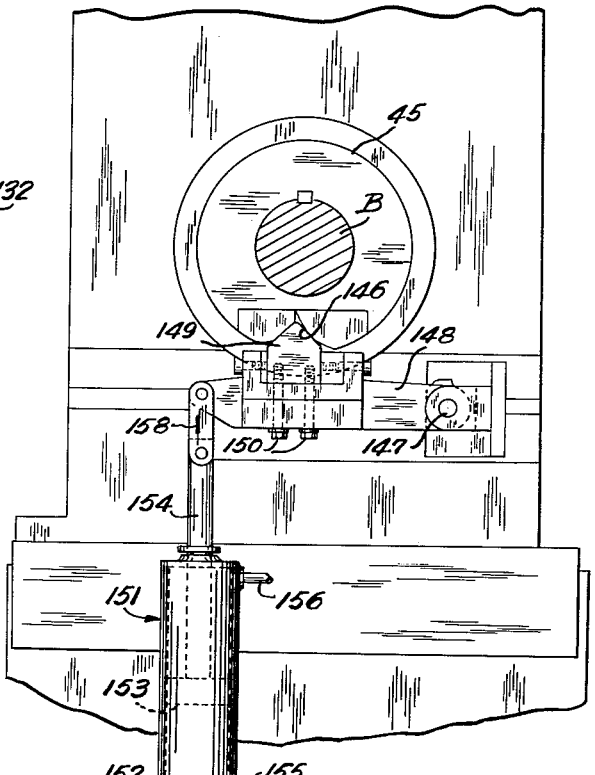
FIG. 5 is a partial vertical section taken on section line 5—5 of FIG. 1 and showing indexing means of the machine on a larger scale.

As indicated above it is an object to provide a machine for producing coiled articles which embodies certain novel constructions which are incorporated in apparatus hereinafter more particularly described. Although the machine of the type concerned is useful in the manufacture of helically coiled articles in general, the following detailed description is, for convenience, directed to its use in the producing of coil springs such as are used in some automobile suspensions.

Referring now to the drawings in greater detail, the frame of the machine is indicated generally by the reference letter A and comprises a bed 10 supported by legs 11 and 12, a reduction gear casing 13, and an overhead member 14 supported by brackets 15 and 16. Work W in the form of hot rod stock is fed by an operator from the front of the machine to be coiled about mandrel 17. The hot rod or coil stock is of a predetermined length and may have tapered ends as seen in the illustration in FIG. 10 of a completed helical coil spring 18. The end of the coil stock is clamped by a clamping bar or dog 20 for rotation with the mandrel 17. The dog 20 is supported by a chuck portion C of a spindle generally indicated at B with which the mandrel 17 rotates when forming a coil or spring. The spindle B is rotated in a manner and by mechanism later to be described.

In coiling the stock about the mandrel 17, the free portion of the coil stock is prevented from rotating with the mandrel by a lead screw 21 which is driven in a direction opposite to that of the mandrel 17. The threads of the lead screw 21 lay the coil stock in longitudinally spaced convolutions against the mandrel 17. After the free end of the work W or coil stock leaves the lead screw 21 it is rolled against the mandrel by a roller 43 finishing the coiled article, whereupon the mandrel is retracted allowing the finished article to drop through the bed of the machine.

The mandrel 17 is supported by a slidable member or tailstock 23 having suitable brackets 24 and 25 in sliding engagement with ways 26 formed on overhead member 14. A member 27 is secured to mandrel 17 by an elongated threaded member or through bolt 28. Member 27 is encircled by a sleeve 29 having a flange 30 abutting a similar flange formed on mandrel 17. Sleeve 29 and member 27 are conveniently rotatably carried by bearings 31 and 32 respectively. A flange is formed on member 27 which is carried by thrust bearing 33 and serves as an abutment for a compression spring which urges sleeve 29 into engagement with the mandrel.

Sliding member or tailstock 23, supported by brackets 24, 25 on ways 26, is adapted to be moved by a fluid pressure actuated motor 34. Motor 34 comprises a cylinder 35 secured to overhead member 14 by brackets 36 and 37 and carries a piston which is adapted to be acted upon by fluid pressure, preferably air, under the control of solenoid operated valves 38 and 39 later referred to. This piston is attached to piston rod 40 which is in turn attached by connecting rods 41 and 42 to the tailstock 23.

Operation of the motor 34 to reciprocate the tailstock carrying the mandrel 17 to the right as seen in FIG. 1 serves to strip a completed coiled article such as spring 18 from the mandrel. Operation in the opposite direction returns the mandrel into engagement with the chuck C of the spindle B.

Figure 6:
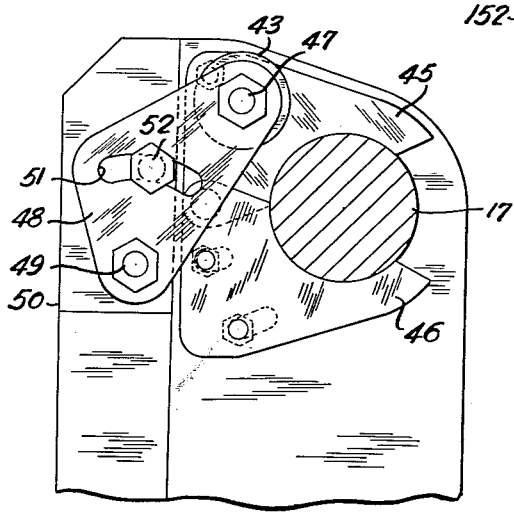
FIG. 6 is a larger scale sectional view taken on section line 6—6 of FIG. 3 and showing the roller and stripper assemblies.

Mounted on bed 10 is a roller and stripper assembly comprising a roller 43 and stripping jaws 45 and 46 as best seen in FIG. 6. Roller 43 is rotatably secured at 47 to a movable plate or arm 48 pivoted at 49 to a bracket 50. Arm 48 is provided with an arcuate slot 51 and a clamping screw 52 to admit adjustment to the work concerned. The jaws 45 and 46 are similarly provided with clamping screws which allow some slight adjustment. Bracket 50 is carried in a suitable manner by a carriage member 52 to allow longitudinal adjustment along bed 10 to accommodate the making of different lengths of coiled articles.

In use the roller 43 acts on the free end of the coil stock after it leaves lead screw 21 and rolls that end against the mandrel 17 thereby finishing the spring or other coiled article. The stripping jaws 45 and 46 fit closely about mandrel 17 which extends through an opening in supporting bracket 50. Upon reciprocation of mandrel 17 by motor 34, the stripping jaws 45, 46 restrain a completed article thereby stripping it from the mandrel. When the mandrel is fully withdrawn the spring or other article will fall through the frame bed.

An additional fluid motor 54 comprising a cylinder 55, piston 56 and piston rod 57 is mounted by bracket 58 to the top of overhead frame member 14. Motor 54 is in the nature of a booster motor and acts through lever 59, pivoted at 60 to overhead member 14, against projections 61 and 62 of tailstock brackets 24 and 25 respectively. This booster motor 54 acts only through the first 3 or 4 inches of the stripping stroke and is used when additional force is needed to aid motor 34 in starting the stroke, as in the making of exceptionally heavy springs.

Spindle B is seen to be rotatably supported by suitable bearings 64 and 65 carried by gear casing 13, which bearings are supplied with suitable seals and retainers. Secured to spindle B is a gear 66 which is adapted to be driven by worm gear 67 on shaft 68. The body 69 of chuck C is attached to the spindle proper by means of a collar 70 which has formed thereon a gear 71 for the purpose of driving lead screw 21.

Figure 7:
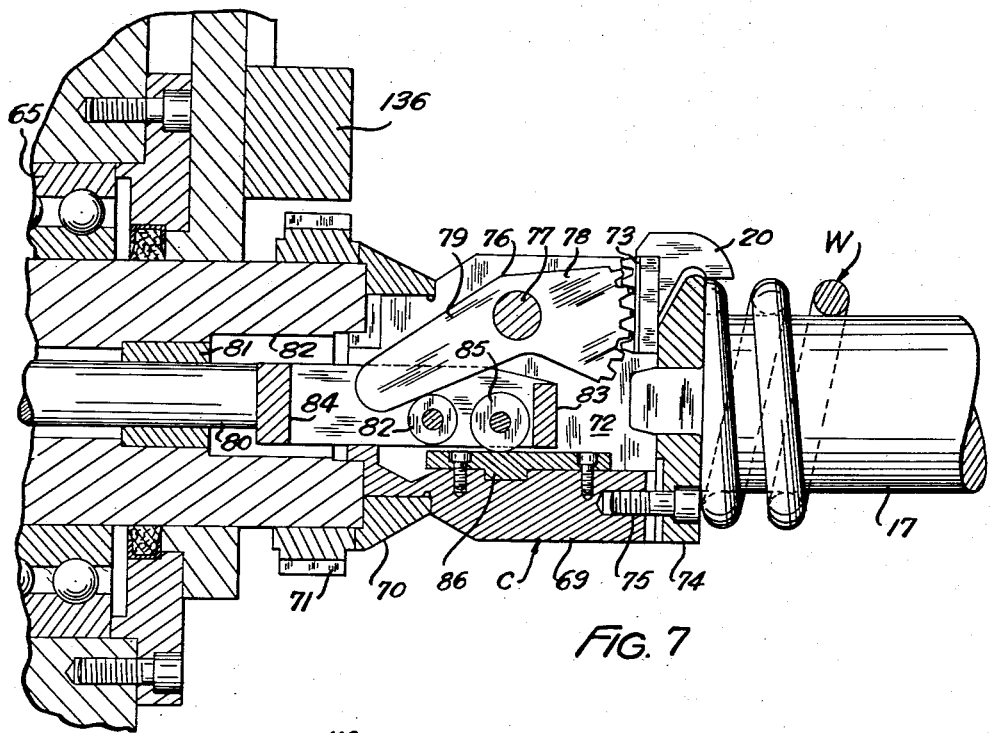
FIG. 7 is a sectional view corresponding with a portion of FIG. 3 and showing the chuck and clamping means on a larger scale.
Figure 8:
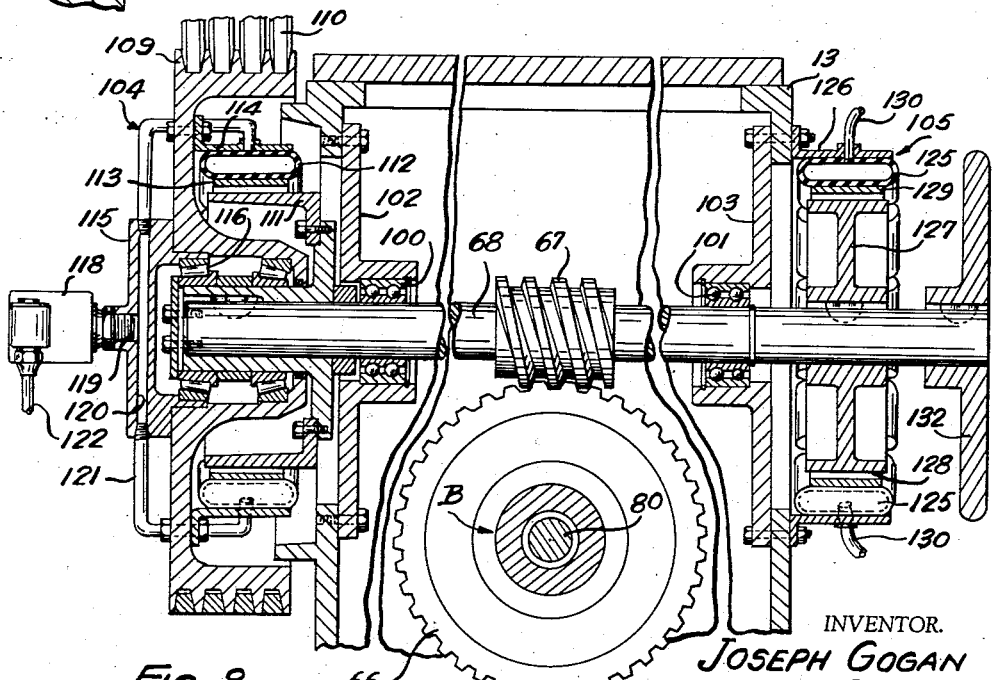
FIG. 8 is a transverse sectional view taken approximately on section line 8—8 of FIG. 3 and showing clutch and brake mechanisms and their relation to the gear casing.

The chuck body 69 has a space 72 inside adapted to contain the operating linkage for dog 20. As best seen in FIG. 7, dog 20 is formed with a toothed rack 73 which is slidably retained in body 69 by a face plate 74 secured to the body by screws 75. A lever 76 is pivoted to body 69 by pin 77. One end of the lever comprises a gear sector 78 engaged with the teeth of rack 73. The other end of lever 76 is in the form of a lever arm 79. Motion of lever arm 79 causing lever 76 to pivot clockwise about pivot pin 77 will result in gear sector 78 imparting a sliding movement to rack 73 bringing dog 20 radially inward. This action of the dog 20 is used to clamp work W to the mandrel 17, the squared end of which is received in a complementary shaped aperture in face plate 74. A pull rod 80 is disposed in a longitudinally extending central bore 82 in spindle B and is suitably bushed for sliding movement therein as by bushing 81. Rod 80 has a squared end portion 83 having an opening 84. Within opening 84 there are disposed roller 85 arranged to ride on plate 86 suitably secured to body 69, and roller 87 adapted to engage lever arm 79. Motion of rod 80 will cause roller 87 to move lever arm 79 and result in clamping action by dog 20.

A fluid pressure actuated motor 90, having a cylinder 91 and a piston 92, is threadedly secured to spindle B at 93 for rotation with the spindle. Pull rod 80 is secured to piston 92 for motion therewith. The fluid for acting on piston 92, preferably air, is conducted to and from rotating cylinder 91 by "Rotorseal" 95 under the control of solenoid-operated valve 96 connected thereto by appropriate piping, a portion of which is seen at 97 and 98. The actuation of the clamping motor 90 is a portion of the operating cycle of the machine and is carried out in timed relation to the remainder of the cycle as will be later explained.

The gears 66 and 67 above referred to are secured to the spindle B and shaft 68 respectively and are a portion of the driving means for rotating the spindle and mandrel 17. Shaft 68 is rotatably supported in gear casing 13 by suitable bearings 100 and 101, supported in turn by elements 102, 103 secured to the walls of gear casing 13. The ends of shaft 68 protrude from casing 13 and engage a clutch assembly 104 on one and a brake assembly 105 on the other.

Mounted atop gear casing 13 is an electric driving motor 106 having a shaft 107 presenting a pulley or sheave 108 which drives another sheave 109, forming a part of clutch assembly 104, through the agency of a number of belts 110.

Keyed to shaft 68 is a drum 111 which is adapted to be engaged by clutch elements 112 having a high friction surface 113. Clutch elements 112 are supported by brackets 114 secured to driven sheave 109. Sheave 109 is attached to hub 115 which is mounted on bearings to freely rotate independently of worm shaft 68. Clutch elements 112 are flexible and are expandable into engagement with drum 111 under the influence of fluid under pressure such as air. "Rotorseal" 118 is threadedly secured at 119 to hub 115 in communication with passage 120. Connecting passage 120 with clutch elements 112 are suitable pipes 121. Fluid under pressure is delivered to "Rotorseal" 118 via pipe 122 under the control of solenoid-operated valve 123 to engage the clutch.

Engagement of clutch 104 causes drum 111 and worm shaft 68 to rotate with sheave 109 resulting in rotation of spindle B through gears 66 and 67. Disengagement of the clutch 104 permits the motor 106 and sheaves 108, 109 to rotate freely. It is therefore not necessary to start the motor 106 under load when beginning to coil work W about mandrel 17.

On the side of the gear casing 13 opposite to the clutch, shaft 68 engages a brake assembly 105 comprising brake elements 125 secured to a cylindrical housing 126 in turn attached to the wall of gear casing 13. Keyed to shaft 68 is a brake drum 127 presenting a surface 128 adapted to be engaged by high friction surfaces 129 of flexible brake elements 125. Piping, seen in part at 130, serves to admit fluid such as air under pressure to brake elements 125, the fluid being under the control of solenoid-operated valve 131. Upon application of pressure to the brake elements 125, brake drum 127 is frictionally engaged and arrested, thereby bringing gears 66 and 67 and spindle B to a halt. Also keyed to shaft 68 is a handwheel 132 which is useful to manually rotate the spindle as in setting up the machine.

Lead screw 21, which is rotated in relation to mandrel 17, is driven by a series of gears from the rotation of the spindle B. Gear 71, which has been described as being formed on the chuck retaining collar 70, is in driving engagement with gear 134. Gear 135 secured directly to the lead screw derives its rotation from gear 134 through an intermediate gear (not shown) which, along with gear 134, is suitably carried by a support 136 affixed to gear casing 13.

The lead screw 21 is supported for rotation by bearing blocks 137 and 138 which are secured to frame member 14, in a position parallel to mandrel 17. The threads of the lead screw guide the coil stock or work W as it is laid against the mandrel in longitudinally spaced convolutions. The lead screw 21 may be made with variably spaced threads to achieve an article having a variable pitch to its coils. The machine may also be set up for left-hand work, though it is illustrated as for making right-hand coils.

Secured for rotation with the spindle B is a gear 140 adjacent motor 90 from which is driven a gear 141. Gear 141 is secured to the input shaft of control box 142, housing two adjustable cam limit switches CLS1 and CLS2. These switches, operated by cams mounted on the just mentioned shaft and driven by gears 140, 141 in relation to the spindle B, serve to control several of the various functions of the machine. The cam limit switches are a part of a control system to be more particularly described hereafter. Their purpose in general is to count the turns made by the spindle B and mandrel 17, and to disengage the clutch 104 and apply the brake 105 after a predetermined number of revolutions of the spindle B, thereby arresting the spindle in a substantially predetermined rotative position. The purpose of this is to place the chuck and clamping dog in the proper position for feeding a new workpiece and also to insure uniformity in the grade of article produced.

Inasmuch as slight variations will occur in the stopping position of the spindle B and chuck C, an indexing, or centering, means has been provided to bring the spindle more exactly to the desired predetermined position.

Keyed to spindle B, adjacent to gear casing 13, is a disk-like member 145 having a V-shaped depression 146 in the periphery thereof. Pivoted to frame A at 147 is a lever arm 148 which carries a wedge 149 suitably secured as by screws 150. A double-acting fluid pressure actuated motor 151 comprising a cylinder 152, a piston 153, and a piston rod 154, is attached to frame A. Piston 153 is received in cylinder 152 and is adapted to move when acted upon by fluid pressure suitably applied through piping 155 and 156 under the control of solenoid actuated valve 157. Piston rod 154 is connected to lever 148 by a link 158.

When the spindle B stops at a position slightly to one side or the other of the predetermined center, actuation of motor 151 will drive wedge 149 into the V-shaped depression and thereby rotate the disk-like member 45 in the appropriate direction to center or index the spindle to the required position. This step is performed with the brake 105 and clutch 104 each disengaged, a subsequent application of the brake maintaining the spindle in its centered position.

Figure 9:
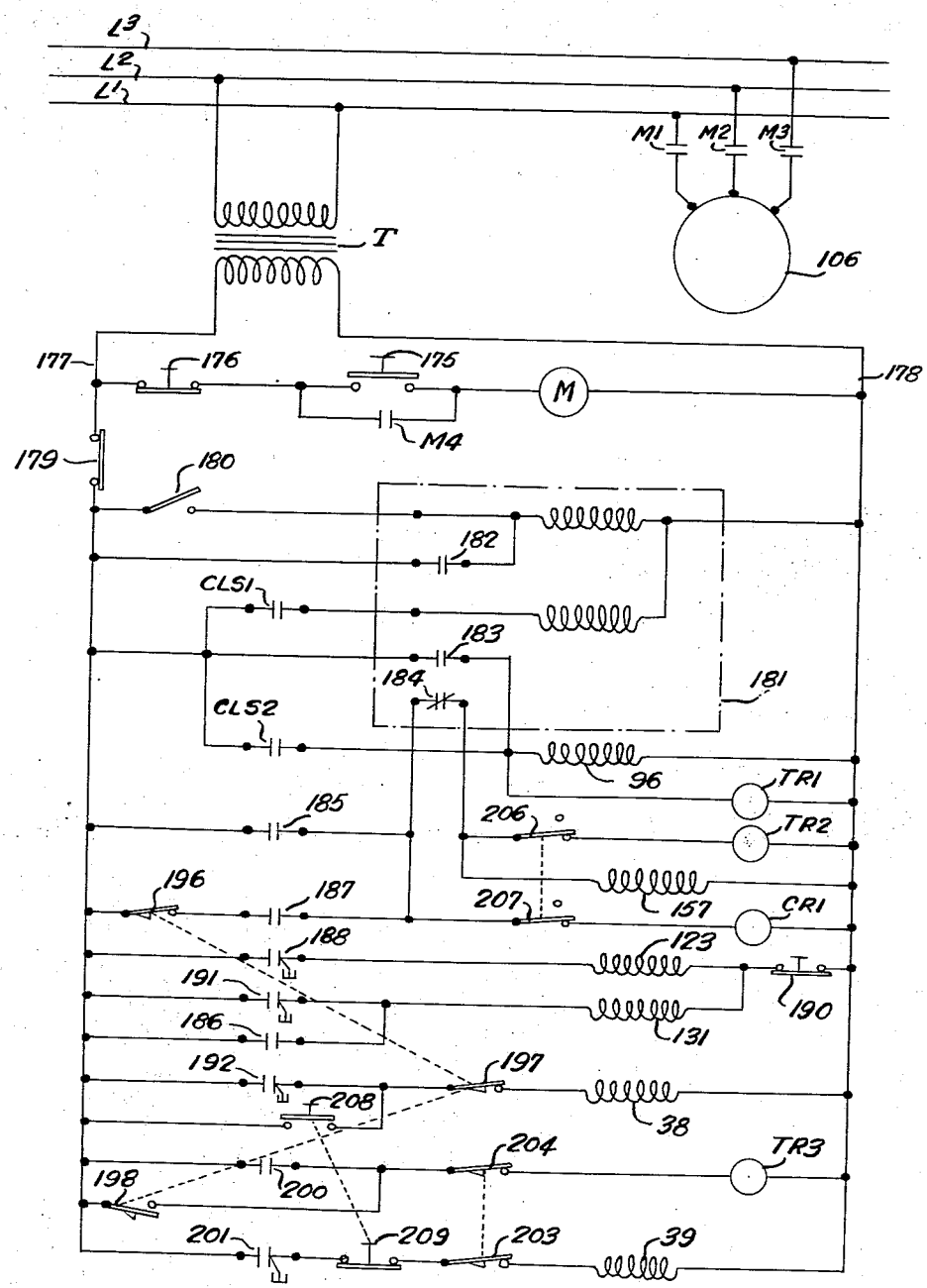
FIG. 9 is a circuit diagram of the control system.

Turning now to the operating cycle of the machine and the control thereof, FIG. 9 is seen to be a somewhat schematic diagram of the electrical circuit involved. Motor 106 is supplied with operating current from power lines L1, L2, and L3 through contacts M1, M2, and M3 of motor starting relay M. Starter M is energized by a closing of switch 175 and held in that condition by holding contacts M4 until stop switch 176 is opened. Power for starter M and the rest of the control circuit is derived from transformer T connected to power lines L1 and L2, and to the control circuit lines 177 and 178. Normally closed switch 179 is an emergency stopping switch which will stop the entire cycle, requiring it to be restarted from the beginning.

Foot switch 180 is arranged to initiate the operating cycle and is closed after the operator has placed a workpiece W under the clamping dog 20. Closing switch 180 energizes a signal counter 181, indicated in broken lines in FIG. 9, which receives a signal of each revolution of spindle B from CLS1. Energizing signal counter 181 closes a holding circuit through contacts 182 holding closed contacts 183 and holding open contacts 184. Contacts 183 complete the circuit energizing solenoid-operated valve 96 to actuate motor 90 and clamp work W to mandrel 17.

Contacts 184, being opened, prevent the energizing of solenoid-operated valve 157 and the actuation of motor 151 controlling the indexing means. Once foot switch 180 is depressed, the cycle is started and the switch may be released. The signal counter remains energized until a preselected number of turns N, required to make the spring, have been made by the spindle B as signaled by CLS1 mounted in box 142.

The closing of contacts 183 also energizes time delay relay TR1 closing contacts 185 to energize relay CR1 closing contacts 187 which allows the cycle to continue after signal counter 181 becomes de-energized upon completion of N turns. Relay TR1 has contacts 186 which energize solenoid-operated valve 131 releasing brake 105, and contacts 188 which, after a time delay to allow the insertion and clamping of work W, close to energize solenoid-operated valve 123 to engage clutch 104 beginning rotation of spindle B.

Spindle B will continue to rotate until the preselected number of turns N have been completed unless prevented by the emergency stop switch 179 which requires a restarting of the cycle, or unless prevented by jog stop switch 190 which interrupts operation by disengaging the clutch 104 and engaging brake 105 but without disturbing the cycle which continues when the jog stop switch is closed again.

At the end of N number of cycles counter 181 de-energizes, allowing contacts 183 to open and 184 to close. Because of the variations in time between the closing of 184 and opening of 183, the latter is momentarily short-circuited by CLS2 so that the rotative stopping position of spindle B and chuck C will be more accurately determined. Opening of CLS2 will de-energize solenoid valve 76 releasing the clamp dog 20, and will de-energize TR1, opening contacts 186 and 188, thereby applying the brake and disengaging the clutch, bringing spindle B to a halt substantially at a predetermined rotative position.

Relay CR1, which has been held energized by its contact 187 supplies power through signal counter contact 184 as soon as the latter closes to energize solenoid-operated valve 157 and time delay relay TR2. Valve 157 actuates the indexing wedge 149 to cooperate with V-shaped depression 146 in disk-like member 145 as soon as the brake 105 is next released, thereby centering the spindle and chuck accurately to the predetermined position above-mentioned.

Time delay relay TR2 has contacts 191 and 192. After a short delay to allow the spindle to stop, contacts 191 close releasing brake 105 to allow the centering by wedge 149 and disk 145. A short time thereafter contacts 192 close energizing solenoid controlled valve 38 to actuate motor 34 and motor 54 to move mandrel 17 away from chuck C through stripping jaws 45, 46, stripping the spring from the mandrel.

The tailstock 23 moves mandrel 17 away from the spindle B and chuck C until it strikes limit switch 195 mounted upon frame member 14. Limit switch 195 has two normally closed contacts 196 and 197 and a normally open one 198. The opening of contact 196 serves to de-energize CR1 and TR2 thereby de-energizing valve 131 to engage the brake and valve 157 controlling the stop or indexing means, while the opening of contact 197 serves to de-energize solenoid valve 38 ending the stripping stroke. Closing of contact 198 of limit switch 195 energizes time delay relay TR3 closing contacts 200 thereof completing a holding circuit to keep TR3 energized after limit switch 195 is released. After a timed delay contacts 201 of TR3 close energizing solenoid-operated control valve 39, actuating motor 34 to return mandrel 17 to the spindle B.

Tailstock 23 continues to move mandrel 17 toward spindle B until the mandrel engages chuck portion C, at which time tailstock 23 strikes limit switch 202 having normally closed contacts 203 and 204. Opening of contacts 204 de-energizes solenoid valve 39 stopping the return motion of the mandrel 17, and opening of contacts 204 releases the holding circuit on relay TR3 thereby leaving the machine ready for the next cycle.

Switches 206, 207, are embodied in a "Man-Auto" selector switch and are provided to permit a less automatic control, in that when they are open the cycle ceases to be automatic just before the stripping phase. With 206 and 207 open it is necessary to operate a strip switch having contacts as at 208 and 209, the operation of which will result in the reciprocation of mandrel 17 to strip a completed article in the manner described before.

Mounted conveniently on the frame member 14 is found a control panel 210 having push buttons 211 for operating the various switches such as emergency stop switch 179, jog stop switch 190, and start switch 175.

From the foregoing description it may be seen that a novel form of machine has been provided for making helically coiled articles such as springs. Although the machine has been described and illustrated in some detail and with reference to making springs, it is understood that it is not to be limited to the particular construction or purpose shown but may be varied within the scope of the invention.

Having described my invention, I claim:

1. A coiling machine having a frame, a spindle rotatably supported by said frame, a mandrel rotatably supported by said frame coaxially with said spindle and adapted to have stock coiled thereabout, clamping means supported by said spindle for clamping stock to be coiled about said mandrel, drive means for rotating said spindle in one direction including a clutch and a brake, cam operated switch means operated in relation to rotation of said spindle, a disk-like member secured for rotation with said spindle, said member having a V-shaped depression in the periphery thereof, a wedge mounted on said frame for movement toward and away from said member, fluid pressure operated means connected to said wedge for effecting said movement, said wedge being adapted to cooperate with said member for rotation of said spindle into a predetermined position for receiving said stock, said clutch and brake being responsive to operation of said switch means to halt rotation of said spindle in a position other than said predetermined position and with said V-shaped depression engageable by said wedge, time delay relay means responsive to said switch means and effective after halting of said spindle to release said brake and to actuate said fluid pressure operated means for moving said wedge into said depression for rotating said spindle from said other position to said predetermined position, said wedge and member being adapted to rotate said spindle in said one direction and in an opposite direction so that said spindle can be centered to said predetermined position from said other position when the latter is on either side of said predetermined position.

2. In a machine for producing helically coiled articles, the combination of a frame, a spindle rotatably supported by said frame, a mandrel mounted on said frame for axial movement with respect thereto and for rotation coaxially with said spindle, said mandrel being adapted to have stock coiled thereabout, fluid pressure actuated means for reciprocating said mandrel for engagement with said spindle and for withdrawal therefrom and from a coiled article, drive means for rotating said spindle, and means for laying said stock longitudinally against said mandrel to form a helical coil thereabout, said fluid pressure actuated means comprising a first fluid pressure motor having a cylinder connected to said frame and a piston connected to said mandrel for effecting movement thereof, a second fluid pressure motor having a cylinder connected to said frame and a piston operable in said cylinder, a lever pivotally mounted on said frame and having one end adapted to be acted on by said second fluid pressure motor, and the other end adapted to effect said axial movement of said mandrel, said second fluid pressure motor having a shorter stroke than said first fluid pressure motor whereby said first and second motors are adapted to act in unison to initiate said withdrawal of said mandrel from a coiled article and said first motor is adapted to complete said withdrawal.

3. In a machine for producing helically coiled articles, the combination of a frame, a spindle rotatably supported by said frame, a mandrel mounted on said frame for axial movement with respect thereto and for rotation coaxially with said spindle, said mandrel being adapted to have stock coiled thereabout, means for rotating said spindle and said mandrel through a predetermined number of turns, means for laying said stock longitudinally against said mandrel when rotating to form a helical coil thereabout, and fluid pressure actuated means for reciprocating said mandrel for engagement with said spindle and for withdrawal from a coiled article upon completion of said predetermined number of turns, said fluid pressure actuated means comprising a first fluid pressure motor having a cylinder connected to said frame and a piston connected to said mandrel for effecting said axial movement thereof, a second fluid pressure motor having a cylinder connected to said frame and a piston operable in said cylinder, a lever pivoted between its ends to said frame and having one end adapted to be acted on by said piston of said second fluid pressure motor and the other end adapted to effect movement of said mandrel, said second fluid pressure motor having a shorter stroke than said first fluid pressure motor whereby said first and second motors are adapted to act in unison for effecting said axial movement of said mandrel to initiate withdrawal of said mandrel from a coil and said first motor is adapted to complete said withdrawl, said means for rotating said spindle and mandrel through a predetermined number of turns comprising a clutch and brake for respectively rotating and halting said spindle, a disk member on said spindle and a wedge member movably mounted on said frame, said disk member having an indentation in its periphery, means for moving said wedge member into said indentation so as to cooperate with said disk member in further rotating said spindle to a predetermined position, counting means connected with said spindle for counting said turns in response to rotation of the spindle, said clutch and brake being responsive to said counting means for halting said spindle, and time delay means to which said brake is responsive to release the spindle after being halted for further rotation by said wedge and disk members into said predetermined position.

4. In a machine of the type having a work supporting spindle mounted for rotation through a predetermined number of turns and drive means therefor including a clutch and a brake for respectively operatively rotating and halting said spindle, a disk member secured to said spindle for rotation therewith, said disk member having an indentation defined in the periphery thereof, a wedge member mounted adjacent said disk member, fluid pressure actuated means on said frame for moving said wedge member into said indentation so as to cooperate with said disk member to adjustably further rotate said spindle to a predetermined position for receiving a workpiece, counting means connected with said spindle and responsive to said operative rotation and effective upon said predetermined number of turns to release said clutch and set said brake, and time delay relay means to which said brake is responsive to release said spindle for the adjusting rotation by said wedge and disk members to said predetermined position.

References Cited in the file of this patent

UNITED STATES PATENTS

| | | |
|---|---|---|
| 2,018,209 | Gogan | Oct. 22, 1935 |
| 2,054,196 | Gogan | Sept. 15, 1936 |
| 2,685,122 | Berthiez | Aug. 3, 1954 |
| 2,771,932 | Sandberg | Nov. 27, 1956 |
| 2,777,336 | Schonstedt | Jan. 15, 1957 |
| 2,868,268 | Lewis et al. | Jan. 13, 1959 |
| 2,909,940 | Dawkins | Oct. 27, 1959 |